United States Patent Office 3,591,377

Patented July 6, 1971

3,591,377

PHOTOGRAPHIC ELEMENTS AND PROCESSES EMPLOYING PHOTOSENSITIVE POLYMERS

Michael J. Alsup, Rochester, N.Y., assignor to Eastman Kodak Company, Rochester, N.Y.

No Drawing. Filed Apr. 24, 1968, Ser. No. 723,918

Int. Cl. G03c *5/00, 1/68*

U.S. Cl. 96—35.1 19 Claims

ABSTRACT OF THE DISCLOSURE

Positive and negative images can be prepared, with an element comprising a photosensitive polyester composition sandwiched between two supports, by a photoadhesion process which comprises exposing the element to actinic radiation and separating the supports to develop an image.

This invention relates to photographic processes and elements. In a particular aspect it relates to photographic elements containing a photocrosslinkable polymer layer and to a photoadhesion process for developing images on such elements.

It is known that certain photosensitive polymeric layers can be crosslinked by exposure to visible or ultraviolet light to yield a pattern of hardened polymer which can be used in various image reproduction processes. In a typical process, such as is described in Schellenberg U.S. Pat. 3,030,208, an image is developed by employing the difference in solubility between the polymer in exposed image areas and unexposed background areas. The unhardened background areas are removed with a solvent therefor, which is a non-solvent for the hardened image areas. This procedure can be used in the preparation of lithographic printing plates, etching resists, and the like photomechanical images. However, the need for a solvent development step employing wet chemicals limits the usefulness of this process.

To eliminate the need for wet chemical development, photothermographic processes employing photohardenable polymeric materials have been developed which depend upon the increase in tackifying point of the polymer in exposed hardened areas. Such processes and materials are described in copending Allen U.S. application Ser. No. 709,496, filed Feb. 29, 1968. When heated to a temperature intermediate between the tackifying temperature of the unexposed, unhardened polymer and the tackifying temperature of the exposed, hardened polymer, polymer in unexposed areas becomes sensually tacky and can be toned with a colored powder, or transferred to a receiving surface. These photothermographic processes are particularly attractive for document copy and related uses, as well as photomechanical uses, because they obviate the need for solvents and wet chemical processing steps.

However, photothermographic processes still require several processing steps. Whereas solvent development processes produce an image with the steps of exposure and solvent wash-off, photothermographic processes produce an image with the steps of exposure, heating and then either toning or transfer. It would be desirable if some of these processing steps could be eliminated and still avoid the use of solvents or other wet chemical development means.

Accordingly, it is an object of this invention to provide a novel method for producing photographic images with a minimum of processing steps.

It is another object of this invention to provide a process for producing both positive and negative photographic images with a single exposure.

It is a further object of this invention to provide novel photographic elements for use in preparing photographic images.

The above and other objects of this invention will become apparent to those skilled in the art from the further description of the invention which follows.

It has been found that when certain photosensitive polyesters are exposed to actinic radiation, there is a change in the adhesive force between the polyester and the support on which it is carried. Thus, in accordance with the present invention, by providing an element which comprises a layer of a photosensitive polyester composition sandwiched between two supports, a positive image can be obtained on one of the supports and a negative image can be obtained on the other support by a photoadhesion process which comprises imagewise exposing the element and then separating or stripping apart the two supports. By appropriate selection of the polyester and the two supports, the relative adhesive forces between the photosensitive polyester composition and the supports can be altered by photoexposure so that the polyester composition in exposed areas will adhere more strongly to one support and the polyester composition in unexposed areas will adhere more strongly to the other support.

The photosensitive polyester layers, which are useful in the present invention, are prepared from thermoplastic, film-forming, photosensitive compositions comprising certain photocrosslinkable polyesters. These polyesters typically have a crystallinity of about 10 percent to about 80 percent, as determined by X-ray diffraction, as glass transition temperature ($T_g$) of less than about —25° C. and an inherent viscosity of about 0.25 to about 0.75. Glass transition temperature is that temperature at which the polyester changes from a molten state to a hard glass state. Inherent viscosity is a measure of the degree of polymerization of the polyester and a reflection of its molecular weight. The values of inherent viscosity used herein are determined at 20° C. from a solution of 0.25 gram of the polyester in 100 milliliters of a solvent mixture composed of 50:50 by volume of phenol:chlorobenzene, and are calculated according to the equation:

$$\eta_{inh} = \frac{\ln(\eta/\eta_0)}{c}$$

where $\eta_{inh}$ is inherent viscosity of the polyester, $\eta$ is the viscosity of the solution, $\eta_0$ is the viscosity of the solvent and $c$ is the concentration in grams of polyester per deciliter of solution.

Suitable polyesters are prepared with 50 mole percent of at least one dihydric alcohol or diol moiety and 50 mole percent of at least two hydroxy-free dicarboxylic acid moieties, about 5 to about 40 mole percent, based on the polyester, of the dicarboxylic acid moieties containing as an integral portion the light-sensitive grouping $$-CH{=}CH-\overset{\displaystyle O}{\overset{\|}{C}}-$$

A wide variety of dihydric alcohols or diols can be utilized in preparing the photosensitive polyesters useful in this invention. Typical of the suitable diols are those having the formula HO—R—OH, where R is a divalent organic radical generally having about 2 to 12 carbon atoms, and including carbon, hydrogen and ether oxygen atoms, e.g., a divalent hydrocarbon radical such as an alkylene radical, a 2,2 - dimethylpropylene radical, a cyclohexylene radical, 1,4 - dialkylenecyclohexane radical, a 1,4 - dimethylenecyclohexane radical, a phenylene radical, etc.; an -alkylene-O-alkylene-radical; an -alkylene-O-cyclohexylene-O-alkylene-radical; and the like. Exemplary diols that can be utilized in preparing these polyesters include: ethylene glycol, diethylene glycol, 1,3-propanediol, 1,4 - butanediol, 1,5 - pentanediol, 1,6 - hexanediol, 1,7 - heptanediol, 1,8 - octanediol, 1,9 - nonanediol, 1,10 - decanediol, 1,12 - dodecanediol, neopentyl glycol, 1,4 - cyclohexanedimethanol, and 1,4 - di - β-hydroxyethoxycyclohexane. Mixtures of such diols can also be used in preparing these polyesters.

One of the dicarboxylic acids (5 to 40 mole percent of the polyester) utilized in combination with a diol in preparing the polyesters useful in this invention contains the light-sensitive moiety $$-CH=CH-\overset{\overset{\displaystyle O}{\|}}{C}-$$

Typical of such dicarboxylic acids is fumaric acid. Particularly useful dicarboxylic acids are those with light-sensitive moieties having the formula $$-R'-CH=CH-\overset{\overset{\displaystyle O}{\|}}{C}-$$

where R' is a divalent arylene radical such as phenylene radical, a naphthylene radical, and the like. Typical of such dicarboxylic acids is p-phenylene diacrylic acid.

The dicarboxylic acid containing the light-sensitive moiety is used in combination with at least one additional dicarboxylic acid, which is free of the light-sensitive moiety, in order to provide the resultant polyester with properties which makes it suitable for use in the present invention. Such modifying dicarboxylic acid can be represented by the formula $$HO\overset{\overset{\displaystyle O}{\|}}{C}-R''-\overset{\overset{\displaystyle O}{\|}}{C}OH$$

where R'' is a divalent organic radical generally having about 3 to 8 carbon atoms including such hydrocarbon radicals as an alkylene radical such as propylene, butylene, isobutylene, hexylene; an arylene radical such as phenylene and the like. Exemplary dicarboxylic acids that can be utilized in combination with the dicarboxylic acid containing the light-sensitive moiety for preparng these polyesters include glutaric acid, adipic acid, pimelic acid, suberic acid, azelaic acid, sebacic acid, α,β-diethylsuccinic acid, α-butyl-α-ethyl glutaric acid, terephthalic acid, isophthalic acid, and the like. Mixtures of such dicarboxylic acids can also be used in preparing these polyesters.

These photosensitive polyesters can be prepared by esterifying a diol and a mixture of dicarboxylic acids of the type described above. Typically, the dicarboxylic acid reactants are in the form of esters of lower monohydric alcohols such as methyl alcohol, ethyl alcohol, n-propyl alcohol, n-butyl alcohol, isobutyl alcohol, isoamyl alcohol, and the like. The esterification reaction can be suitably effected in the presence of an interesterification catalyst such as a tetraalkyltitanate at an elevated temperature in an organic solvent, in accordance with usual practice.

The polyesters employed in this invention are compatible with, and the effectiveness of their operation can be enhanced by, such known photographic addenda as sensitizers, pigments, dyes, plasticizers, and the like. For example, the present light-sensitive polyesters can be sensitized with such materials as 6-methoxy-β-2-furyl-2-acrylonaphthone, Michler's ketone, Michler's thioketone, quinolizone, 2 - chloroanthraquinone, 2,6 - bis(p-azidobenzal) - 4 - methylcyclohexanone, thiazoles, pyrylium dye salts, thiapyrylium dye salts and the like sensitizers to obtain highly sensitized photosensitive compositions. Typical suitable sensitizers are described in French Pats. 1,086,257 and 1,089,290 and U.S. Pats. 2,610,120, 2,690,966, 2,670,285, 2,670,286, 2,670,287, 2,732,301 and 3,250,615.

In preparing elements useful in the practice of the present invention, the photosensitive polyester composition is coated on a first or base support from a solvent in accordance with usual practice. In addition to the polyester, this coating composition can optionally include a sensitizer, as mentioned above, and a pigment or dye to give the image optical density. The polyester compositions are soluble in a number of conventional organic solvents such as ketones (e.g., methyl ethyl ketone, acetone, etc.), esters (e.g., ethyl acetate, etc.), chlorinated hydrocarbons (e.g., ethylene chloride, chloroform, dichloroethane, trichloroethane, etc.) and the like.

The base support on which the photosensitive polyester composition is coated can be transparent to the exposing radiation, or it can be opaque thereto. Suitable support materials include paper, polyethylene-coated paper, polypropylene-coated paper, metal sheets and foils, polymeric film such as poly(ethylene terephthalate) film, polystyrene film, cellulose acetate film, cellulose acetate butyrate film, and the like. The degree of adhesion of the polyester composition to the support can be altered by subbing the support with known subcoating materials. Suitable such materials includes gelatin, colloidal silica, synthetic polymers such as polyvinyl acetals (e.g., polyvinyl formal), partially degradated polyacrylamides, hydrosol terpolymers, such as described in U.S. Pat. 3,143,421 (e.g., a terpolymer of methyl acrylate, itaconic acid and vinylidene chloride, a terpolymer of acrylonitrile, acrylic acid and vinylidene chloride, etc.), and the like, as well as mixtures thereof. Other useful subbing materials include the so-called tergels which are the subject matter of copending Nadeau et al. U.S. application Ser. No. 597,669, filed Nov. 29, 1966.

Overlying the photosensitive polyester composition is a second or cover support which is transparent to the exposing radiation. This second support can be selected from those materials which are suitable for the first support and which are transparent to the exposing radiation, and can optionally be subbed with one of the abovementioned subbing materials which is transparent. The second support can be placed over the photosensitive layer before it is completely dry so that it will adhere thereto. Preferably, the second support is laminated to the photosensitive polyester layer with a roller at a temperature which will facilitate uniform adhesion of the photosensitive polyester composition to the second support, e.g., a temperature of between about 25° C. and 150° C. The force with which the roller is loaded can vary widely; loading forces of at least about 10 pounds per linear inch of roller are generally used, with loading forces up to 50 pounds per linear inch being suitable.

Images are prepared using the elements of this invention by imagewise exposing the element to a light source and then separating or stripping apart the two supports. The polyesters of this invention are inherently sensitive in the ultraviolet region of the spectrum. When sensitizers such as those described hereinabove are incorporated in the photosensitive polyester composition the spectral sensitivity can be extended into the visible region of the spectrum. Suitable light sources which can be employed in exposing these elements include both white light sources and sources rich in ultraviolet radiation such as carbon arc lamps, mercury vapor lamps, fluorescent lamps, tungsten lamps, photoflood lamps, and the like.

After exposure, the two supports, between which the photosensitive polyester layer is sandwiched, are separated or stripped apart to yield a positive image on one support and a negative image on the other. In some instances clean separation of the images can be facilitated by warming the element prior to separating the supports. In other instances it is preferable that the element be at room temperature. Which method of separation is preferable can be determined readily by those skilled in the art.

Which support will carry the positive image will depend upon such factors as the relative adhesive forces between the polyester composition and each of the supports, the support through which the element was exposed, the amount of exposure which the polyester composition received, etc. Above a certain minimum level, exposure generally increases the adhesive force between the polyester composition and the support through which it is exposed. Thus, if the element is prepared so that the polyester adheres more strongly to the first or base support than it does to the second or cover support, exposure through the cover support will increase the adhesive force of the polyester to the cover support, and, upon separation of the supports, a negative image will be obtained on the cover support and a positive image will be obtained on the base support. However, when extremely short exposures are employed, it has been found that there is a decrease in the adhesive force between the polyester composition and the support through which it is exposed. Thus, by proper selection of support materials and appropriate adjustment of the adhesive force of the polyester thereto, a positive image can be obtained on the cover support and a negative image on the base support.

In most instances, it is desirable that the cohesive force of the polyester composition be greater than the adhesive force between the polyester composition and the supports. Under such circumstances the line of fracture will be at the interface of the polyester with the supports, and clean positive and negative images will be obtained on the respective supports. When, however, it is desired that only one image be utilized, better resolution and sharper images can be obtained if the cohesive force of the polyester is less than the adhesive force between the polyester and the non-image-bearing support. Under such conditions the line of fracture in the image areas will be within the polyester composition itself, thus, yielding a sharper image. If the cohesive force of the polyester composition is greater than the adhesive force between the polyester composition and the non-image-bearing support, the line of fracture in the image areas can be shifted from the polyester-support interface into the polyester composition by giving the polyester composition an overall exposure through the non-image-bearing support after imagewise exposure to thereby increase the adhesive force between the polyester composition and the non-image-bearing support.

The simple construction and uncomplicated processing of the photosensitive elements of this invention permit these elements to be used with consistent results in a wide variety of known photographic and photomechanical procedures. Such uses include the preparation of document copies, the preparation of projection transparencies, color proofing and similar uses, the preparation of lithographic printing plates, the preparation of etching resists, and the like.

The following examples are included for a further understanding of the invention.

EXAMPLE 1

A 2.5 mil thick poly(ethylene terephthalate) support, subbed with a terpolymer comprising 15 percent methylacrylate, 2 percent itaconic acid, and 83 percent vinylidene chloride, is coated to give a dry coverage of 1.2 g./ft.$^2$ with the following formulation:

| | G. |
|---|---|
| Poly(pentamethylene-bis-p-phenylene diacrylate-co-azelate) 37.5/62.5 ($\eta_{inh}$=0.47, $T_g$=−37° C.) | 10 |
| Neutral pigments (Phthalophore Blue, C. I. 74160, 1.5 parts; Indofast Yellow, C. I. 70600, 1.5 parts; Light Litho Rubine, C. I. 15850, 1 part) | 2 |
| 2,6-bis(p-ethoxyphenyl) - 4 - (p-n-amyloxyphenyl) thiapyrylium perchlorate | 0.2 |
| Ethyl acetate | 39.2 |
| Etheylene chloride | 9.8 |

The coating is dried and a clear unsubbed poly(ethylene terephthalate) support is then laminated over it, using pressure rollers heated to about 100° C. This element is then imagewise exposed through the clear unsubbed cover support for 20–25 seconds to a light source composed of 28 35-watt tungsten iodide lamps at a distance of 1 nich from the element and separated therefrom by frosted glass. In exposed areas the polyester is crosslinked and the adhesive force between it and the cover support is increased, while in unexposed areas there is no crosslinking. The two supports are then stripped apart, after being warmed to facilitate separation, and a negative image is obtained on the clear unsubbed cover support through which the element was exposed.

EXAMPLE 2

A coating of the polyester composition described in Example 1 is made on the subbed film support described in Example 1. Over this coating there is laminated with heated pressure rollers at a temperature of about 100° C. a transparent 1 mil thick poly(ethylene terephthalate) support on which is coated colloidal silica in a cellulose diacetate binder. This element is then exposed to the light source described in Example 1 for 20–25 seconds and then the two supports are separated. A positive image of the original is obtained on the transparent cover support.

EXAMPLE 3

A subbed poly(ethylene terephthalate) support described in Example 1 is coated to give a dry coverage of 0.3 g./ft.$^2$ with the following formulation:

| | G. |
|---|---|
| Poly(pentamethylene-bis-p-phenylene diacrylate-co-azelate) 25/75 ($\eta_{inh}$=0.49, $T_g$=−55° C.) | 10 |
| Neutral pigments | 1 |
| 2,6-bis(p-ethoxyphenyl) - 4 - (p-n-amyloxyphenyl) thiapyrylium perchlorate | 0.4 |
| Ethyl acetate | 39.2 |
| Ethylene chloride | 9.8 |

This coating is allowed to dry and there is then laminated over it a clear unsubbed poly(ethylene terephthalate) support. The element is then exposed, in contact with an original, in a Bruning "Revolute" machine at a speed of 5 feet per minute. "Revolute" is a trade name for a commercially available photocopying machine employing a high pressure mercury vapor lamp as the light source. When the two supports are stripped apart, a negative image is obtained on the laminated clear cover sheet.

EXAMPLE 4

An element prepared as described in Example 3 is exposed in contact with an original in the Bruning "Revolute" machine at a speed of 20 feet per minute. When the two supports are stripped apart, a positive image is obtained on the clear laminated cover sheet.

EXAMPLE 5

Elements are prepared by coating the polyester composition of Example 3 on clear unsubbed poly(ethylene terephthalate) film support and then laminating thereover a second clear unsubbed poly(ethylene terephthalate) film support. When these elements are imagewise exposed either through the base support or the cover support to the exposure units described in Example 1 and then stripped apart, a positive image is obtained on the support furthest from the exposure source.

EXAMPLES 6–13

When elements are prepared substituting the following polyesters for the polyester employed in Example 3, results similar to those observed in Example 3 are obtained.

| Example | Diol | Percent diol | Percent diethyl-p-phenylene diacrylate | Acid | Percent acid | Tg | $\eta$ inh |
|---|---|---|---|---|---|---|---|
| 6 | 1,4-butanediol | 50 | 7.5 | Adipic | 42.5 | −46.5 | .55 |
| 7 | do | 50 | 15 | do | 35 | −37 | .54 |
| 8 | do | 50 | 10 | {Succinic<br>{Azelaic | 35<br>5 | −28.5 | .53 |
| 9 | do | 50 | 10 | {Succinic<br>{Azelaic | 25<br>15 | −37.5 | .42 |
| 10 | 1,5-pentanediol | 50 | 20 | Azelaic | 30 | −37.5 | .60 |
| 11 | do | 50 | 18.75 | do | 31.25 | −41.5 | .24 |
| 12 | do | 50 | 18.75 | do | 31.25 | −37 | .40 |
| 13 | do | 50 | 17.5 | do | 32.5 | −31.5 | .49 |

The invention has been described in detail with particular reference to certain preferred embodiments thereof, but it will be understood that variations and modifications can be effected within the spirit and scope of the invention as described hereinabove and defined in the appended claims.

What is claimed is:

1. A photoadhesion process which comprises the steps of:
  (a) imagewise exposing to actinic radiation an element comprising,
    (1) a first support, on which is coated
    (2) a layer of a photocrosslinkable polyester composition having a glass transition temperature of less than about −25° C., an inherent viscosity of about 0.25 to about 0.75 and a crystallinity of about 10 percent to 80 percent, as determined by X-ray diffraction, and adhered over said polyester layer
    (3) a second transparent support,
  to crosslink the polyester in exposed areas; and
  (b) separating the first support from the second support to develop a positive relief image on one of said supports and a negative relief image on the other of said supports.

2. A photoadhesion process as defined in claim 1, wherein the photocrosslinkable polyester composition comprises a polyester having
  (a) 50 mole percent of at least one dihydric alcohol moiety, and
  (b) 50 mole percent of at least two dicarboxylic acid moieties, about 5 to 40 mole percent of said dicarboxylic acid moieties containing as an integral portion a $$—CH{=}CH—\overset{O}{\overset{\|}{C}}—$$

group, and the remainder of said dicarboxylic acid moieties having 5 to 10 carbon atoms.

3. A photoadhesion process as defined in claim 2, wherein the dicarboxylic acid moiety containing the $$—CH{=}CH—\overset{O}{\overset{\|}{C}}—$$

group is derived from a dicarboxylic acid selected from the group consisting of fumaric acid and p-phenylene diacrylic acid, and the remainder of the dicarboxylic acid moieties is derived from a dicarboxylic acid having the formula $$HO\overset{O}{\overset{\|}{C}}—R''—\overset{O}{\overset{\|}{C}}OH$$

where R″ is selected from the group consisting of alkylene radicals having 3 to 8 carbon atoms and arylene radicals having 3 to 8 carbon atoms.

4. A photoadhesion process a defined in claim 2, wherein the dihydric alcohol moiety is derived from an alcohol having the formula HO—R—OH where R is a divalent organic radical having 2 to 12 carbon atoms selected from the group consisting of hydrocarbon radicals, -alkylene-O-alkylene- radicals and -alkylene-O-cyclohexane-O-alkylene- radicals.

5. A photoadhesion process as defined in claim 1, wherein the photocrosslinkable polyester composition contains a sensitizer selected from the group consisting of pyrylium dye salts and thiapyrylium dye salts.

6. A photoadhesion process as defined in claim 1, wherein the photocrosslinkable polyester composition contains a colorant.

7. A photoadhesion process as defined in claim 1, wherein the first and second supports are poly(ethylene terephthalate) film.

8. A photoadhesion process which comprises the steps of:
  (A) imagewise exposing to actinic radiation an element comprising,
    (1) a first support, on which is coated
    (2) a layer of a photocrosslinkable polyester composition having a glass transition temperature of less than about −25° C., an inherent vicosity of about 0.25 to about 0.75 and a crystallinity of about 10 percent to 80 percent, as determined by X-ray diffraction, said polyester having
      (a) 50 mole percent of at least one dihydric alcohol moiety derived from an alcohol having the formula HO—R—OH wherein R is a divalent organic radical having 2 to 12 carbon atoms,
      (b) 50 mole percent of at least two dicarboxylic acid moieties, about 5 to 40 mole percent of said dicarboxylic acid moieties being derived from p-phenylene diacrylic acid, and the remainder of said dicarboxylic acid moieties being derived from a dicarboxylic acid having the formula $$HO\overset{O}{\overset{\|}{C}}—R''—\overset{O}{\overset{\|}{C}}OH$$

where R″ is a divalent organic radical having 3 to 8 carbon atoms and adhered over said polyester layer
    (3) a second transparent support, to crosslink the polyester in exposd areas; and
  (B) separating the first support from the second support to develop a positive relief image on one of said supports and a negative relief image on the other of said supports.

9. A photographic element for preparing an image by a photoadhesion process, said element comprising:
  (a) a first support, on which is coated
  (b) a layer of a photocrosslinkable polyester composition having a glass transition temperature of less than about −25° C., an inherent viscosity of about 0.25 to about 0.75 and a crystallinity of about 10 percent to 80 percent, as determined by X-ray diffraction and
  (c) a second transparent support adhered over said polyester layer.

10. A photographic element as defined in claim 9 wherein the photocrosslinkable polyester composition comprises a polyester having
  (a) 50 mole percent of at least one dihydric alcohol moiety, and (b) 50 mole percent of at least two dicarboxylic acid moieties, about 5 to 40 mole percent of said dicarboxylic acid moieties containing as an integral portion a $$-CH{=}CH-\overset{\displaystyle O}{\overset{\|}{C}}-$$

group, and the remainder of said dicarboxylic acid moieties having 5 to 10 carbon atoms.

11. A photographic element as defined in claim 10, wherein the dicarboxylic acid moiety containing the $$-CH{=}CH-\overset{\displaystyle O}{\overset{\|}{C}}-$$

group is derived from a dicarboxylic acid selected from the group consisting of fumaric acid and p-phenylene diacrylic acid, and the remainder of the dicarboxylic acid moieties is derived from a dicarboxylic acid having the formula $$HO\overset{\displaystyle O}{\overset{\|}{C}}-R''-\overset{\displaystyle O}{\overset{\|}{C}}OH$$

where R″ is selected from the group consisting of alkylene radicals having 3 to 8 atoms and arylene radicals having 3 to 8 carbon atoms.

12. A photographic element as defined in claim 10, wherein the dihydric alcohol moiety is derived from an alcohol having the formula HO—R—OH where R is a divalent organic radical having 2 to 12 carbon atoms selected from the group consisting of hydrocarbon radicals, -alkylene-O-alkylene-radicals and -alkylene-O- cyclohexane-O alkylene-ridicals.

13. A photographic element as defined in claim 12, wherein the dihydric alcohol moiety is derived from an alcohol selected from the group consisting of diethylene glycol, neopentyl glycol, 1,4-butanediol, 1,5-pentanediol, 1,6-hexanediol and 1,4-cyclohexanedimethanol.

14. A photographic element as defined in claim 9, wherein the photocrosslinkable polyester composition contains a sensitizer selected from the group consisting of pyrylium dye salts and thiapyrylium dye salts.

15. A photographic element as defined in claim 9, wherein the photocrosslinkable polyester composition contains a colorant.

16. A photographic element as defined in claim 9, wherein the first and second supports are poly(ethylene terephthalate) film.

wherein said first support is a poly(ethylene tereph-

17. A photographic element as defined in claim 9, wherein said first support is a poly(ethylene terephthalate) film coated with a layer of a subbing material to improve adhesion of the polyester composition, and the second support is a clear, unsubbed poly(ethylene terephthalate) film.

18. A photographic element as defined in claim 10, wherein said first support is a poly(ethylene terepthalate) film coated with a layer of a terpolymer of methyl acrylate, itaconic acid and vinylidene chloride, and said second support is clear, unsubbed poly(ethylene terephthalate) film.

19. A photographic element for preparing an image by a photoadhesion process, said element comprising:

(a) a first support, on which is coated (b) a layer of a photocrosslinkable polyester composition having a glass transition temperature of less than about −25° C., and inherent viscosity of about 0.25 to about 0.75 and a crystallinity of about 10 percent to 80 percent, as determined by X-ray diffraction, said polyester having (1) 50 mole percent of at least one dihydric alcohol moiety derived from an alcohol selected from the group consisting of diethylene glycol, neopentyl glycol, 1,4-butanediol, 1,5-pentane diol, 1,6-hexanediol and 1,4-cyclohexane-dimethanol, and (2) 50 mole percent of at least two dicarboxylic acid moieties, about 5 to 40 mole percent of said dicarboxylic acid moieties being derived from p-phenylene diacrylic acid, and the remainder of said dicarboxylic acid moieties being derived from a dicarboxylic acid selected from the group consisting of adipic acid and azelaic acid, said polyester composition including a colorant and a sensitizer, and (c) a second transparent support adhered over said polyester layer.

References Cited

UNITED STATES PATENTS

| | | | |
|---|---|---|---|
| 3,060,023 | 10/1962 | Burg et al. | 96—28 |
| 3,353,955 | 11/1967 | Colgrove | 96—28 |
| 3,030,208 | 4/1962 | Schellenberg et al. | 96—35.1 |
| 2,195,362 | 3/1940 | Ellis | 96—115 |
| 3,408,191 | 10/1969 | Jeffers | 96—35.1 |

OTHER REFERENCES

Chemical Abstracts, vol. 64, 1966, page 9136d.

J. TRAVIS BROWN, Primary Examiner

E. C. KIMLIN, Assistant Examiner

U.S. Cl. X.R.

96—115